US011173395B2

(12) United States Patent
Miyazaki et al.

(10) Patent No.: US 11,173,395 B2
(45) Date of Patent: Nov. 16, 2021

(54) GAME DEVICE, GAMING HEM, AND PROGRAM PRODUCT

(71) Applicant: BANDAI CO., LTD., Tokyo (JP)

(72) Inventors: Takahiro Miyazaki, Tokyo (JP); Wataru Higuchi, Tokyo (JP); Takashi Iida, Toyonaka (JP)

(73) Assignee: BANDAI CO., LTD., Tokyo (JP)

( * ) Notice: Subject to any disclaimer, the term of this patent is extended or adjusted under 35 U.S.C. 154(b) by 221 days.

(21) Appl. No.: 16/269,219

(22) Filed: Feb. 6, 2019

(65) Prior Publication Data

US 2019/0168117 A1 Jun. 6, 2019

Related U.S. Application Data

(63) Continuation of application No. PCT/JP2017/022902, filed on Jun. 21, 2017.

(30) Foreign Application Priority Data

Aug. 31, 2016 (JP) .............................. JP2016-170001

(51) Int. Cl.
*A63F 13/44* (2014.01)
*A63F 13/52* (2014.01)
(Continued)

(52) U.S. Cl.
CPC .............. *A63F 13/44* (2014.09); *A63F 13/20* (2014.09); *A63F 13/22* (2014.09); *A63F 13/45* (2014.09);
(Continued)

(58) Field of Classification Search
CPC .. A63F 13/12; A63F 1/04; A63F 13/00; A63F 1/00; A63F 9/24
See application file for complete search history.

(56) References Cited

U.S. PATENT DOCUMENTS

2003/0171142 A1  9/2003  Kaji et al.
2010/0302171 A1  12/2010  Yoshida
(Continued)

FOREIGN PATENT DOCUMENTS

JP   2001-036897 A    2/2001
JP   2001-276430 A   10/2001
(Continued)

OTHER PUBLICATIONS

Monster Hunter 4, Weekly Famitsu, vol. 28, No. 45,1299-th Edition, pp. 140-141, Oct. 24, 2013.
(Continued)

*Primary Examiner* — Reginald A Renwick
(74) *Attorney, Agent, or Firm* — Rabin & Berdo, P.C.

(57) ABSTRACT

A game device for playing a game includes a first display, a computing device, and a storage medium containing program instructions stored therein, execution of which by the computing device causes the game device to provide the functions of: obtaining item information including a game character which is used by the user in the video game, from a user item, receiving an input of an operation for the video game from the user, displaying a notification image for notifying the user of a timing of a first operation on the first display, while displaying a first animation that includes a plurality of frames, and in response to the reception of a first operation by the operation input unit during the displaying of the first animation, stopping displaying the rest of frames of the first animation after a timing at which the first operation is received.

15 Claims, 10 Drawing Sheets

(51) Int. Cl.

| | |
|---|---|
| *A63F 13/5375* | (2014.01) |
| *A63F 13/95* | (2014.01) |
| *A63F 13/22* | (2014.01) |
| *A63F 13/45* | (2014.01) |
| *A63F 13/80* | (2014.01) |
| *A63F 13/20* | (2014.01) |
| *A63F 13/533* | (2014.01) |
| *A63F 13/833* | (2014.01) |
| *G06T 13/40* | (2011.01) |

(52) U.S. Cl.
CPC ............ *A63F 13/52* (2014.09); *A63F 13/533* (2014.09); *A63F 13/5375* (2014.09); *A63F 13/80* (2014.09); *A63F 13/833* (2014.09); *A63F 13/95* (2014.09); *G06T 13/40* (2013.01)

(56) References Cited

U.S. PATENT DOCUMENTS

| | | | |
|---|---|---|---|
| 2013/0288794 A1* | 10/2013 | Ando | A63F 13/69 463/31 |
| 2016/0059130 A1* | 3/2016 | Shimoda | A63F 13/537 463/31 |

FOREIGN PATENT DOCUMENTS

| | | | |
|---|---|---|---|
| JP | 2004-041740 | A | 2/2004 |
| JP | 2006-251202 | A | 9/2006 |
| JP | 2007-000665 | A | 1/2007 |
| JP | 2007-061340 | A | 3/2007 |
| JP | 2007-075140 | A | 3/2007 |
| JP | 4019114 | B1 | 12/2007 |
| JP | 2009-297303 | A | 12/2009 |
| JP | 2011-019642 | A | 2/2011 |
| JP | 2012-065817 | A | 4/2012 |
| JP | 2014-176724 | A | 9/2014 |
| JP | 2015-116268 | A | 6/2015 |
| JP | 5925347 | B1 | 5/2016 |
| JP | 6058101 | B1 | 1/2017 |

OTHER PUBLICATIONS

"The new Dragon Ball Heroes series 'Super Dragon Ball Heroes' will start this fall in sequence!", Dengeki Arcade Web [online], Jun. 10, 2016, [Search Date: Sep. 7, 2017], Internet: <URL: http://dengekionline.com/elem/000/001/293/1293758>.

Kouji Fukada, "Why is a social game so addictive?", First Edition, Fifth Impression, Softbank Creative Corporation, ISBN978-4-7973-6623-5, p. 85, Feb. 20, 2012.

* cited by examiner

| CHARACTER ID | 301 |
| CHARACTER NAME | 302 |
| VARIOUS PARAMETERS | 303 |
| DISPLAY INFORMATION | 304 |

| CHARACTER ID | 311 |
| CHARACTER NAME | 312 |
| VARIOUS PARAMETERS | 313 |
| DISPLAY INFORMATION | 314 |
| DETECTED COORDINATES AND DIRECTION | 315 |
| ACTION POINTS | 316 |

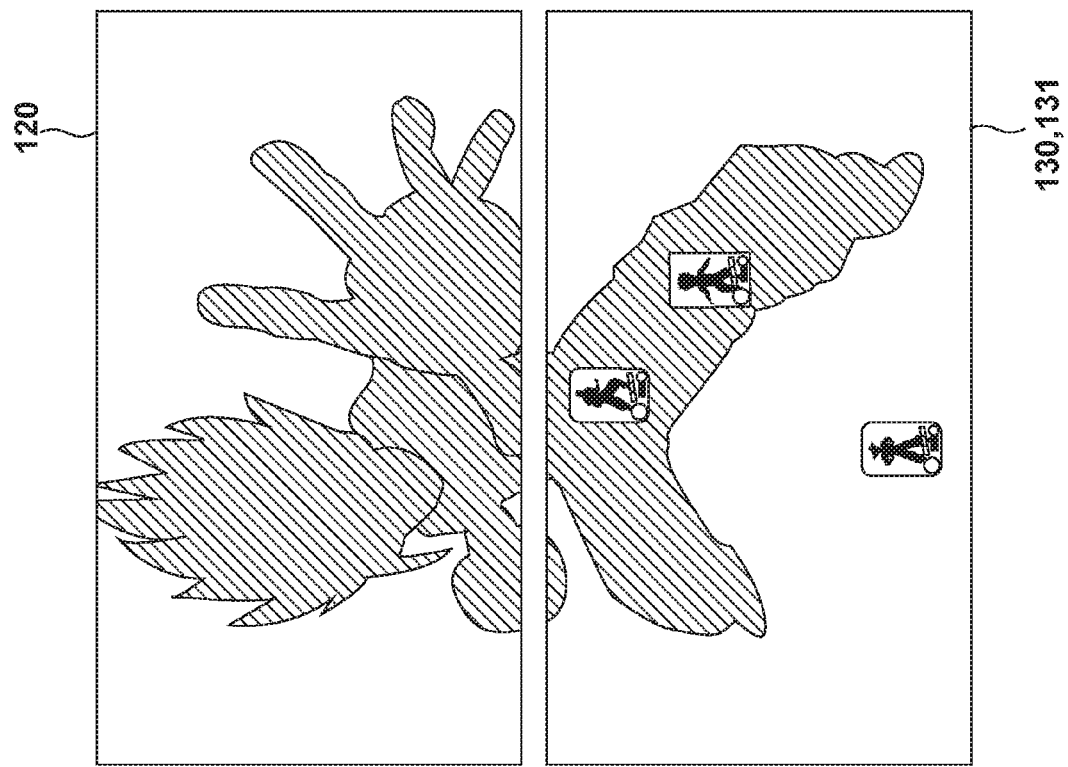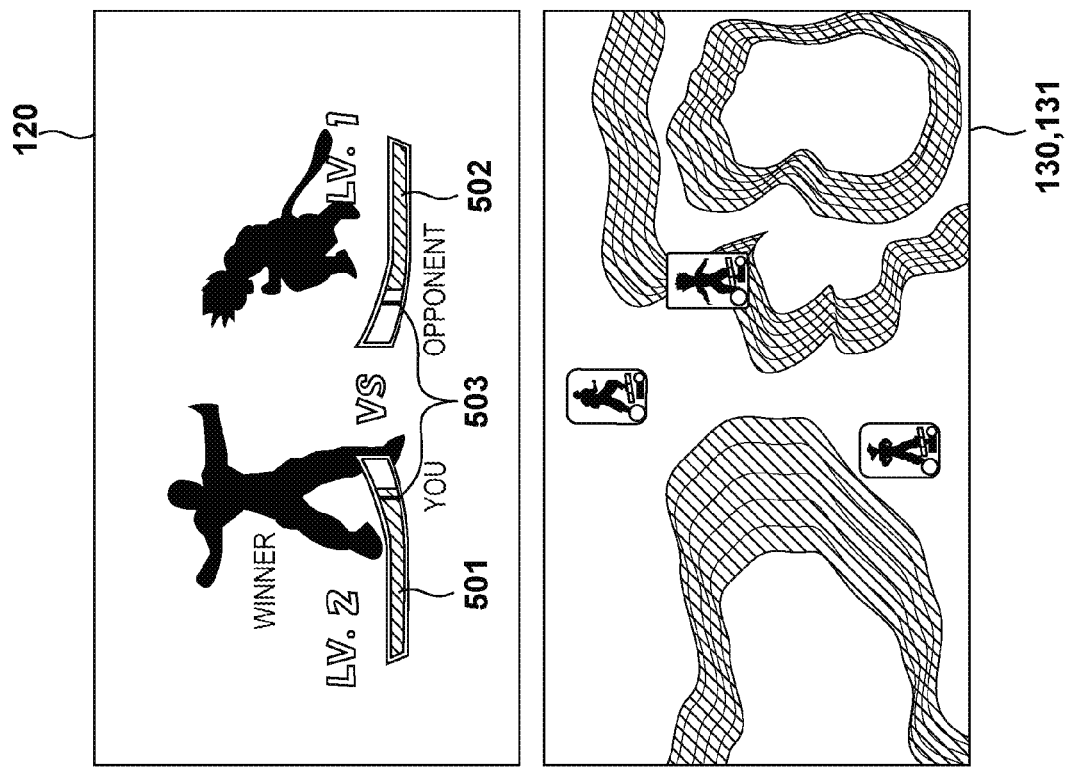

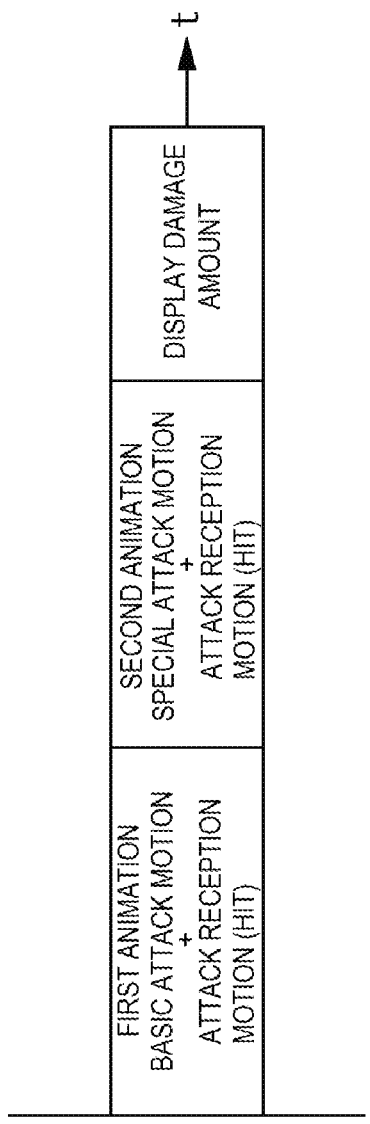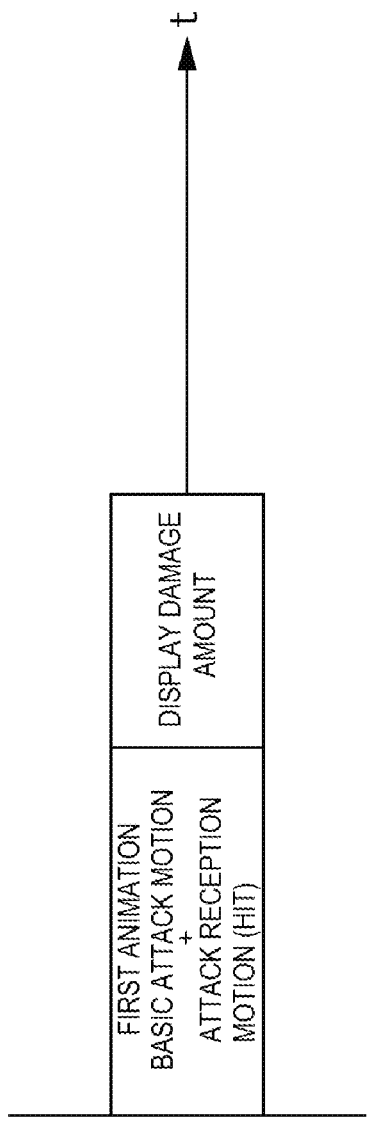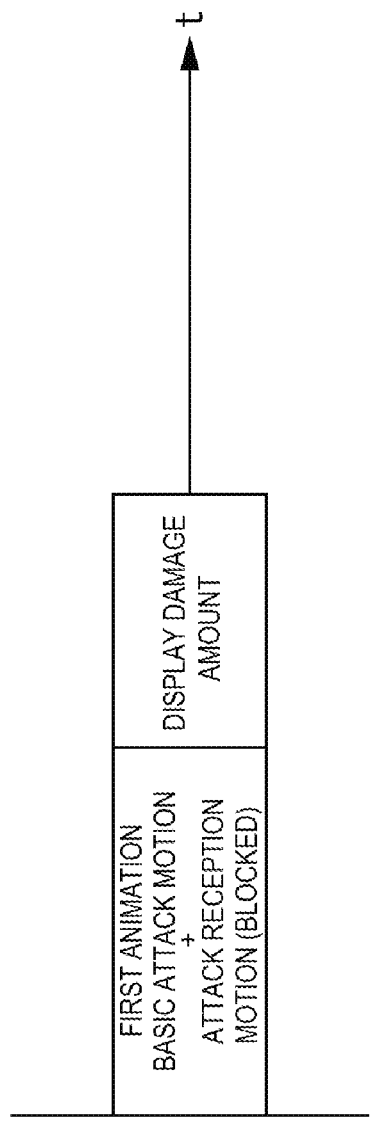

GAME DEVICE, GAMING HEM, AND PROGRAM PRODUCT

CROSS REFERENCE TO RELATED APPLICATIONS

This is a continuation application of International Application PCT/JP2017/022902 filed on Jun. 21, 2017, which claims priority from a Japanese Patent Application No. 2016-170001 filed on Aug. 31, 2016, the contents of which are incorporated herein by reference.

BACKGROUND OF THE INVENTION

Technical Field

The present invention relates to a game device, a gaming item, and a program, and in particular, relates to a game device that executes a game based on item information acquired from an item.

Background Art

There are game devices that have a function of ejecting items such as cards, and by causing information from a card possessed by a user to be acquired, a gameplay experience in which a game element corresponding to the item appears can be provided. Japanese Patent Application Laid-Open Publication No. 2004-041740 discloses a card game device in which a plurality of cards are placeable on a board surface, and in which input operations are performed to change the positions within the game of characters corresponding, respectively, to the cards.

In recent years, the game content handled by such game devices has been widely commercialized in forms that go beyond game devices such as video works relating to the content and toy products of characters and items that appear in the content, which work to synergistically garner interest in the content.

SUMMARY OF THE INVENTION

In a card game device such as that described above that is provided so as to draw interest towards the content thereof, the desired play experience for the users differs depending on the goals and preferences of the users, such as users who aim to collect cards (items), users who aim for an optimal combination of cards to compete in terms of the score in the fighting game, users who enjoy operating the characters who appear in video works as well as interactions such as movements of the characters. Thus, among those users who aim to collect cards and users who aim to compete in terms of the score in the fighting game, there are those who do not feel a need to view interactions such as movements of characters. Thus, a configuration inch the play experience of the game depending on the goals and preferences of each user is anticipated.

The present invention was made in consideration of the above problem, and an object thereof is to provide a game device, a gaming item, and a program by which it is possible to change the gameplay experience depending on the goals and preferences of each user.

According to one aspect of the invention, a game device for playing a video game includes a first display configured to display the video game, a computing device, and a storage medium containing program instructions stored therein, execution of which by the computing device causes the game device to provide the functions of: a recognition unit configured to obtain item information from a user item of a user, the item information including a game character which the user plays in the video game; an operation input unit configured to receive an input of an operation for the video game from the user; a controller configured to control the displaying of the video game to cause the game character to appear on the first display on the first display, using the item information, the video game including a first animation that is related to the game character and that includes a plurality of frames, cause a notification image for notifying the user of a timing of a first operation to be displayed on the first display, while displaying the first animation, the displaying of the first animation being stopped in response to reception of the first operation, and in response to the reception of the first operation by the operation input unit during the displaying of the first animation, cause the rest of frames of the first animation after a timing at which the first operation is received not to be displayed.

According to another aspect of the invention, a computer program product for a game device, the game device including a first display configured to display the video game and a computing device to execute program instructions, the computer program product including a computer readable storage medium and the program instructions stored on the computer readable storage medium, the program instructions includes program instructions to obtain item information from a user item of a user, the item information including a game character which is used by the user in the video game, program instructions to receive an input of an operation for the video game from the user, program instructions to control the displaying of the video game to cause the game character to appear on the first display, using the item information, the video game including a first animation that is related to the game character and that includes a plurality of frames, program instructions to cause a notification image for notifying the user of a timing of a first operation to be displayed on the first display, while displaying the first animation, the displaying of the first animation being stopped in response to reception of the first operation, and in response to the reception of the first operation by the operation input unit during the displaying of the first animation, program instructions to cause the rest of frames of the first animation after a timing at which the first operation is received not to be displayed.

According to the present invention having such a configuration, it is possible to change the play experience of the game depending on the goals and preferences of each user.

BRIEF DESCRIPTION OF THE DRAWINGS

FIGS. 5A and 5B show examples of game ns displayed in displays during an action phase of a fighting game according to an embodiment and a modification example of the present invention.

FIGS. 6A, 6B, and 6C are drawings for describing display transitions during the action phase of a fighting game according to an embodiment and a modification example of the present invention.

DETAILED DESCRIPTION OF EMBODIMENTS

Embodiment

An illustrative embodiment of the present invention will be explained below in detail with reference to the drawings. In the embodiment described below, an example will be described in which the present invention is applied to a game device that can provide gameplay based on information acquired from an item as an example of a game device. However, the present invention can be applied to any device that can execute a game based on information acquired from an item.

In the present embodiment, the item, which is ejected from a game device or circulates in another form and can be used in a game, is a card, but as long as the item is configured such that item information to be described later can be acquired therefrom, the item is not limited to being a card. The item may, for example, be a molded object such as a figure having the external appearance of a game element (character or item), for example. In such a case, the item information may be acquirable from a pattern on a sticker, a printed pattern, or the like on a prescribed surface such as the bottom surface of the molded object, or from a recording medium inside the molded object. Also, the item need not be a figure, and may be any type of item such as a toy or a sticker.

Also, in the present embodiment, unchanging item information is converted to a one- or multi-dimensional pattern (code) by performing a prescribed conversion operation thereon and applied to the card by being formed (printed) on the surface of all cards that can be used in the game. The formation of codes on the card surfaces in the present embodiment is performed by printing using invisible ink.

However, implementation of the present invention is not limited thereto, and the code may be printed on the card surface in a visible manner, or a prescribed recognition pattern for the code may be formed in a middle layer of the card. Also, the item information may be changeable, and in such a case, the information may be recorded in a tag for near field communication (NFC) embedded in the card, with acquisition (recognition) and modification of the information being enabled through a prescribed reader/writer. Also, the form in which changeable item information is affixed to the card is not limited to an NFC tag, and any aspect may be used such as the information being recorded in a recording medium such as an IC chip and stored as data.

Also, during gameplay executed by the game device of the present embodiment, game elements that can appear by using the card are characters, and an image of the character (character image) is printed on the corresponding card. However, implementation of the present invention is not limited thereto, and cards for identifying game elements of a game being executed are not limited to identifying characters in the game, and such cards may naturally be enabled to identify other game elements such as items and effects.

<<Game Device 100>>

Figure 1:
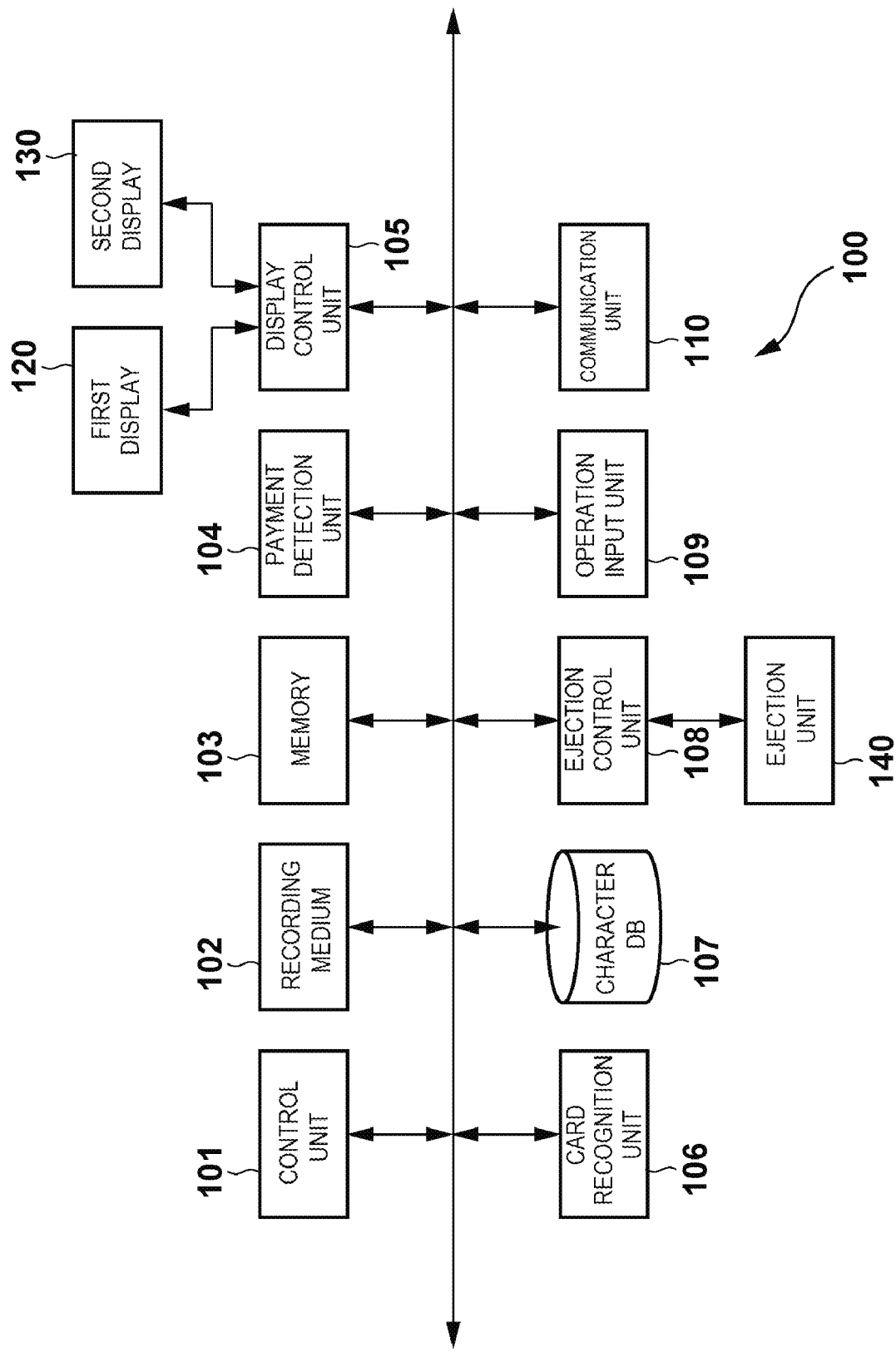
FIG. 1 is a block diagram showing a function configuration of a game device 100 according to an embodiment and a modification example of the present invention.

Here, the function configuration of the game device 100 will be described using the block diagram of FIG. 1.

A control unit 101 is a CPU, for example, and controls the operation of each block of the game device 100. Specifically, the control unit 101 reads an operation program of each block recorded in a recording medium 102 and controls the operation of each block by loading such programs in a memory 103 and executing them.

The recording medium (storage medium) 102 is a recording device that can permanently store data such as a non-volatile memory or an HDD, for example. The recording medium 102 stores, in addition to operation programs (program instructions) of the blocks in the game device 100, information such as parameters necessary for the operation of the blocks, and various graphic data used in the game executed by the game device 100. The memory 103 is a storage device used for temporary data storage such as a volatile memory, for example. The memory 103 is used not only as a loading region for loading operation programs of the blocks, but also as a storage region for temporarily storing data and the like outputted during the operation of each block.

A payment detection 104 detects that payment has occurred in the game device 100. Payment may be determined by detecting that cash of a prescribed amount or an equivalent value in token coins has been inserted into a cash insertion opening, that a payment process based on communication with a chip for a prescribed electronic money system has been completed, or the like. The game device 100 of the present embodiment starts providing a service resulting from the ejection of a card to a user on the basis of the payment, but payment is not a necessary condition, and the service may be started on the basis of a prescribed start command.

The display control unit 105 includes a graphic device such as a GPU, for example, and in the present embodiment performs generation and control of the screen displayed on a second display 130 in a second display area and on a first display 120 in a first display area. Specifically, during operation of the game device 100 (during gameplay or standby) the display control unit 105 executes an appropriate operation on a necessary object to be drawn on the basis of a process or command issued by the control unit 101, and draws the screen. The generated screen is outputted to the second display 130 and the first display 120, which are display devices that are in the same case as the game device 100 or are attached in a detachable manner to the outside of the game device 100, and the screen is shown to the user by being displayed in a prescribed display region.

Figures 2, 3A, 3B:
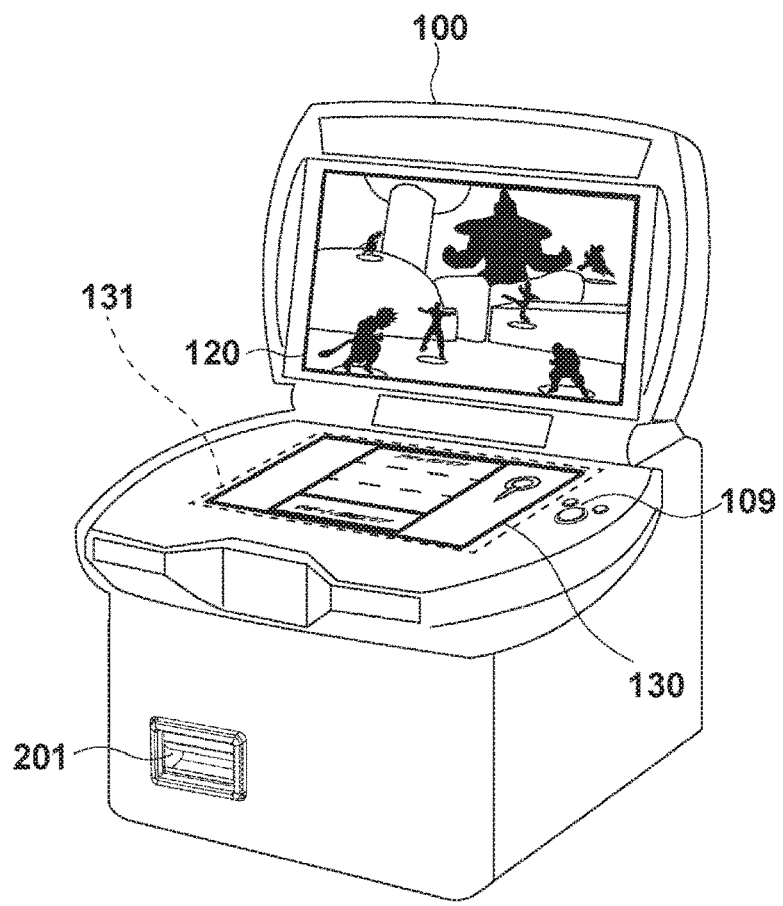
FIG. 2 shows an example of an external view of the game device 100 according to an embodiment and a modification example of the present invention.
FIGS. 3A and 3B show examples of a configuration of various data according to an embodiment and a modification example of the present invention.

The game device 100 of the present embodiment has two types of display devices (first display 120 and second display 130) that display the game screens, as shown in FIG. 2, and the display control unit 105 generates game screens in each of the display devices. As shown, in the present embodiment, the second display 130, having a second display area, is configured so as to have a board surface (placement panel 131) (operation area) on which a card is movably placeable, and by the user moving the placed card at a prescribed timing, it is possible to perform some operation inputs for the game. There are a plurality of types of game screens for providing a suitable game experience displayed in the second display 130, which will be described later, and included among those types of screens is a screen that displays an image of a field to be the reference for placement of the card as shown in FIG. 2 (two-dimensional image configured so as to express the position or region in which to place the card). Meanwhile, the first display 120 in essence displays a game screen generated on the basis of a movement operation of a card performed on the board surface of the second display 130, the game screen being drawn from an overhead view of the character corresponding to the card, or the character and other characters who appear the game, or displays various animations to be described later, for example.

The display device according to the second display 130 of the present embodiment is configured so as to be able to recognize an invisible code affixed to the card placed on the placement panel 131. More specifically, the second display 130 is configured so as to be able to recognize and detect the position and rotation of the card placed on the placement panel 131 from the rear (inner side of case of game device 100) of the second display 130 while displaying the game screen generated by the display control unit 105. If the invisible code printed on the card is made of infrared-reflective ink, then the liquid crystal panel layer and light guide layer necessary for the placement panel 131 and display are all configured to be infrared-transmissive, and no casing is provided that serves as a shield on the bottom surface of the light guide layer. In such a case, the invisible code printed on the card placed on the placement panel 131 can be imaged by an infrared camera provided inside the game device 100.

A card recognition unit 106 acquires the item information of the card placed on the placement panel 131, identifies each placed card, and detects the position and rotation of each card. The card recognition unit 106 can simply have an infrared camera that images the second display 130 from the rear such as described above, for example, and by extracting and converting the invisible code from the image attained by imaging, the item information is acquired from the card on the placement panel 131. For simplicity, in the present embodiment, cards that can be used in the games on the game device 100 each correspond to one character that appears in each game. Thus, the item information of the card can be unchanging information formed so as to enable identification of the character provided so as to be able to appear in the game, and the item information includes information for identifying the character associated with the card in a simple manner. Thus, when the card recognition unit 106 detects from the captured image that a new card has been placed while it is able to receive placement of cards used during gameplay (captured image includes invisible code for which analysis is not complete), then by analyzing the invisible code affixed to the card, a character ID for identifying the character associated with the card is acquired. Also, the card recognition unit 106 acquires the placement position of the card from the position in the captured image where the invisible code was detected, and the position is managed, as information of the card used for game play (placement card information), in the memory 103, for example, in association with the character ID. In the configuration, the invisible code may include the predetermined direction of the card and even information for distinguishing the front and back of the card, and in analyzing the invisible code, the card recognition unit 106 detects the orientation of the card (placement direction on the board surface) and manages this as placed card information.

In the present embodiment, if a card is placed on the placement panel 131, the card recognition unit 106 acquires item information of the card and detects the position and the like, but implementation of the present embodiment is not limited to this configuration. That is, a configuration may be adopted in which the item information in the card used for gameplay is acquired by a separately provided reader, and patterns invisibly printed on the card do not include identification information of the character associated with the card but are only used for identifying the card from which the item information was acquired, for detecting movement of the card, and the like.

Also, in the present embodiment, in order to provide a suitable gaming experience, the card recognition unit 106 detects the position and direction of the card placed on the placement panel 131, but detection of the direction need not be performed depending on the form of display performed for the card in the second display 130, the shape of the placement panel 131 or the card, the configuration and format of the invisible code, or the like.

A character DB 107 is a database that manages character information for each preset character to appear in the game. As shown in FIG. 3A, for example, in association with a character ID 301 that uniquely identifies the character, a character name 302, various parameters 303 of the character in the game (values (health, attack strength, defense strength, etc.) unique to the character that determine superiority as the game progresses, various types of performance, operation conditions, etc.), and display information 304 that indicate images, model data, and the like used for displaying the character in the game screen.

An ejection control unit 108 controls ejection of the card for each round of gameplay based on payment. The card ejected by the game device 100 may be ejected prior to the start of the game sequence providing prescribed gameplay (fighting game), for example. An ejection unit 140 may be a card dispenser, for example, have a stocker (not shown) that stacks cards in the vertical direction, and have a mechanism for ejecting one card stored at the bottom of the stocker according to an ejection command issued by the ejection control unit 108. If the ejection unit 140 is installed in the same case as the game device 100, the ejected card may be provided to the user by being guided to an ejection opening 201 (FIG. 2) that can be accessed from outside the game device 100. Cards ejected from the game device 100 of the present embodiment are configured so as to have an invisible code having unique item information as described above, and thus, are ready-made cards that were printed and manufactured in advance, and all cards are formed to be the same shape and size.

An operation input unit 109 is a user interface of a game device 100 such as an operation member or various sensors for inputting decisions, for example. When the operation input unit 109 detects that an operation input on the operation member has been performed, it outputs a control signal corresponding to the operation input to the control unit 101. In the present embodiment, the operation input unit 109 detects operation inputs to various user interfaces provided in the game device 100 has physical operation members, and is a separate user interface with differing detection targets than operation inputs resulting from movement of the card detected by the card recognition unit 106. The operation input unit 109 may include a touch input detection sensor that detects touch input on the screen of the first display 120 or the second display 130, for example.

The communication unit 110 is a communication interface of the game device 100 for communication with an external device. The communication unit 110 connects to the external device through a communication medium that may be a wired or wireless connection such as a communication network including the Internet or a cable (not shown), and enables transmission and reception of data. The communication unit 110 converts information inputted to be transmitted into data of a prescribed format, and transmits the data to the external device such as a server through the network. Also, when the communication unit 110 receives information from the external device through the network, it encodes the information and stores it in the memory 103. Also, the game device 100 of the present embodiment is configured so as to be able to receive, from the external device through the communication unit 110, program data in which programs for processes pertaining to the game are packaged. When the program data is received by the communication unit 110 together with an update request for the program, the control unit 101 can, according to the update request, update the program for the process pertaining to the game currently stored in the recording medium 102, using the received program data. The update process for the program for processes pertaining to the game can be executed automatically when the program recorded in the recording medium is inserted into air optical drive or the like (not shown) of the game device, or executed according to a start command by a manager after insertion.

<<Game Summary>>

Below, a game provided in the game device 100 of the present embodiment will be summarized.

The game provided in the game device 100 of the present embodiment is a fighting game that is played in rounds between a player team including the user's characters, or in other words, the characters associated with cards placed on the placement panel 131 (player character) and an opponent team including opponent characters selected by a prescribed method. In this fighting game, the player team and the opponent team are each given a team health, which is the total health set for the characters constituting each team, and the team that reduces the opponent team's health to 0 within a predetermined upper limit for the number of rounds is the winner of the game.

Each round is constituted of a strategy phase in which actions of each character of the player team in the round are determined in consideration of the states of the player team and the opponent team, and actions determined during the strategy phase are executed as the game progresses, and processes pertaining to increases and decreases in team health are performed. Here, during the strategy phase, the fighting game does not progress, and once the ending conditions for the strategy phase are satisfied and the game moves onto the action phase, the fighting game progresses in consideration of actions determined for the player team, actions determined for the opponent team, the state of the characters and teams, and the like.

In essence, the strategy phase and the action phase differ in that in the former, movement operations of cards placed on the placement panel 131 are received, whereas in the latter, movement operations of the cards placed on the placement panel 131 are not received (not necessary). In other words, in the game device 100 of the present embodiment, the period during which a movement operation by the user of cards placed on the placement panel 131 is received is limited to the strategy phase, and during the action phase, the user is not asked to perform movement operations of the cards. During the action phase, simple operation inputs on physical operation members, for example, may be received as necessary, but in order to prevent movement operations not intended by the user or increases in difficulty of gameplay, movement operations of cards on the placement panel 131 while confirming game progress in the first display 120 are made unnecessary.

Below, a specific game flow and display control will be described as an example of one aspect of a fighting game provided in the game device 100 of the present embodiment.

<Strategy Phase>

Figure 4A:
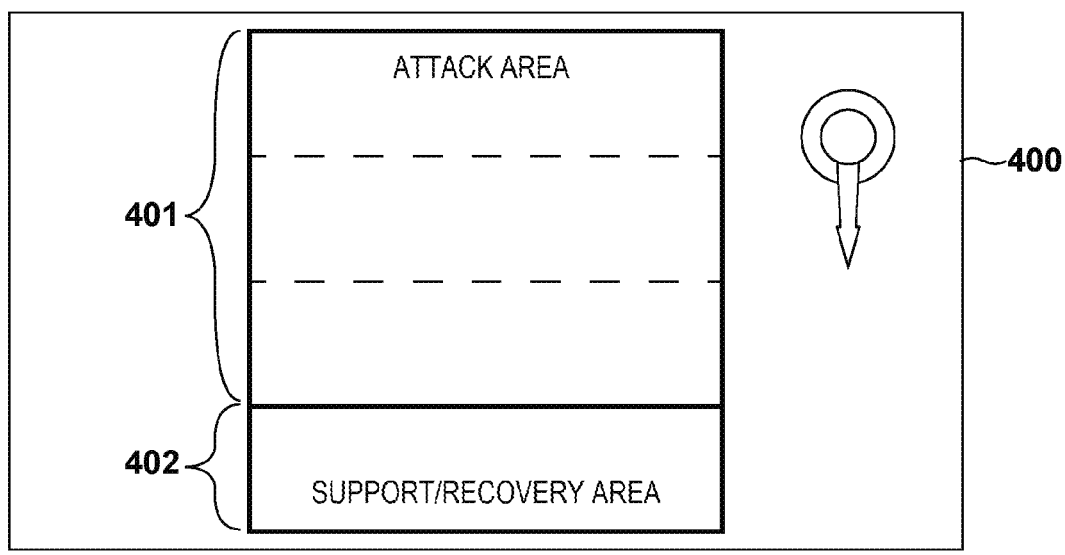
FIGS. 4A, 4B, and 4C show examples of game screens displayed in displays during a strategy phase of a fighting game according to an embodiment and a modification example of present invention.
Figure 4B:
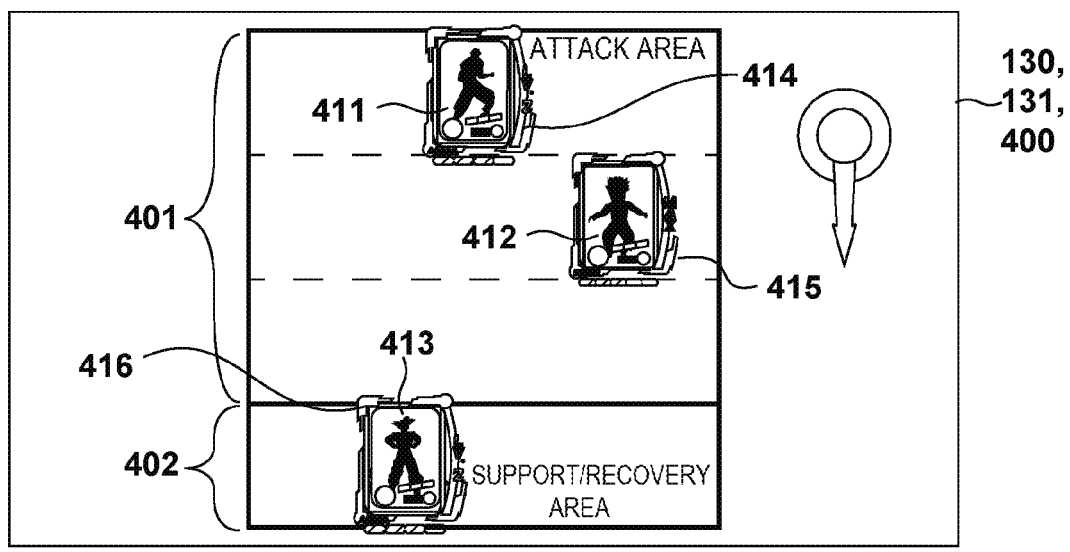
Figure 4C:
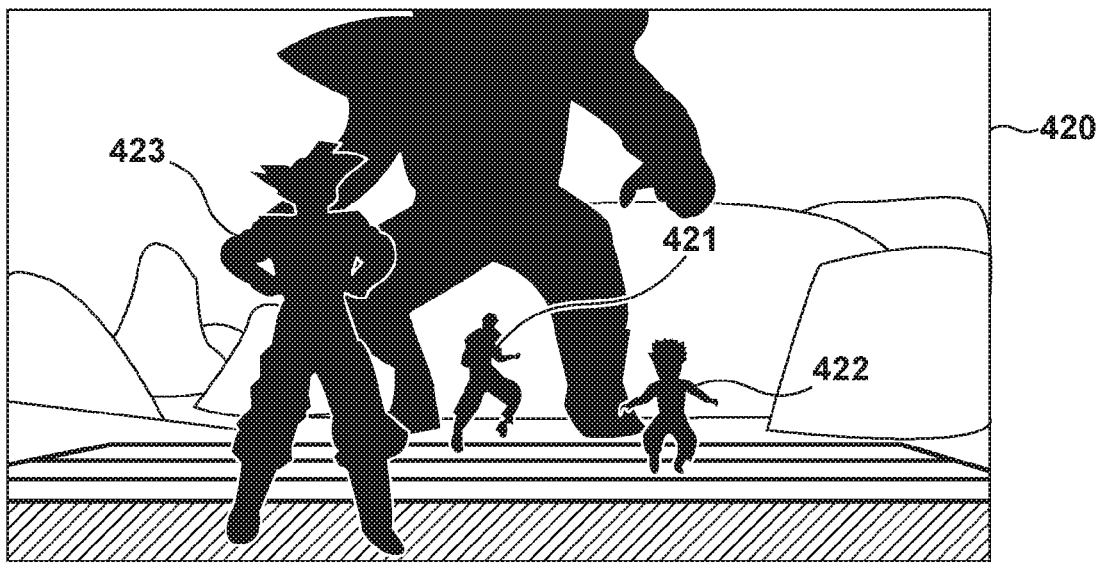

During the strategy phase, in order to set guidelines for the actions of each player character during the following action phase (same round), a game screen 400 such as that shown in FIG. 4A is displayed in the second display 130. An attack area 401 and a standby area 402 shown in the game screen 400 are regions where the player characters can be arranged in a space (3D space) in the fighting game. By the user placing cards on the placement panel 131 of the second display 130 so as to at least partially overlap the attack area 401 or the standby area 402 displayed in the second display 130, the player characters associated with the cards can be arranged in the game space. If, for example, cards 411, 412, and 413 shown in FIG. 4B are placed on the placement panel 131, then as shown in the game screen 420 displayed in the first display 120 shown in FIG. 4C, characters 421, 422, and 423 respectively corresponding to the cards are arranged while maintaining the relative positional relationship in the space of the fighting game.

The attack area 401 and the standby area 402 are areas with differing roles within the game such as actions performed during the action phase or effects applied at the end of the round for the player characters corresponding to the placed cards (overlapping the display of the areas).

The standby area 402 is for charging action points for player characters corresponding to cards placed therein without performing actions (attacks) for reducing the team health of opponent characters during the action phase. Action points are points that by being consumed during the action phase allow the character to make an attack motion. When action points are 0, the player character cannot make an attack motion, and thus, the user would need to move the card of the corresponding player character to the standby area 402. Also, the initial value of the action points, the amount of increase in the number of points by placing the card in the standby area 402, and the maximum degree to which points can be charged, for example, may be determined by various parameters 313 of the character information for each character.

Meanwhile, the attack area 401 is for player characters corresponding to cards placed therein to perform attack motions by consuming action points. As shown in FIG. 4A, the attack area 401 is divided into three regions, and the shorter the distance to the opponent team is, the greater the amount of action points consumed is, and the greater the degree to which the health of the opponent team is reduced by an attack motion. Here, the attack area 401 and the standby area 402 correspond to the space in the game determined when setting up against the opponent team in the fighting game, and are set such that the distance from the opponent team increases in the order of the attack area 401 and the standby area 402. In other words, the upper edge of the attack area 401 in FIG. 4A indicates the frontmost area in the space facing the opponent team, and the further to the back of the game device 100 (upper direction of area 401) the user places cards, the greater the degree to which the character corresponding to the card can reduce the opponent team health.

Thus, by the user performing movement operations on cards placed on the placement panel 131 during the strategy phase of each round, the user can determine actions to be performed and state changes to be made during the action phase of the same round, determine the arrangement of characters in the game, or the like. In the game device 100 of the present embodiment, the game screen displayed in the second display 130 is controlled such that the user can easily concentrate on movement operations of the cards during the strategy phase and be able to perform intended movement operations of the cards. More specifically, in the game device 100 of the present embodiment, associated images 414, 415, and 416 indicating various information of the respective cards are displayed around the cards 411, 412, and 413 placed on the placement panel 131 as shown in FIG. 4B, and the configuration allows for the user) easily know which card movement operations to perform during the strategy phase by referring to the information. The display of various information relating to the card is set in positions determined on the basis of the placement position of the cards detected by the card recognition unit 106, and control of the display position is performed according to the movement of the cards.

In other words, all necessary information is consolidated in the second display 130 during the strategy phase, and thus, the user has no need to perform a movement operation of the card on the second display 130 while alternately switching gaze between the second display 130 and the first display 120, or to perform the movement operation of the card on the second display 130 by feel while keeping the gaze on the first display 120, and the user can focus on the movement operation of the card. Additionally, in the second display 130, a frame image is displayed at a position corresponding to the placement position of the recognized card, and thus, it is possible for the user to determine whether or not the card has been correctly recognized (examples of the card not being correctly recognized, for example, include cases in which the movement operation results in the card overlapping another card and being recognized as being placed in another position, or the recognized position is slightly offset as a result of a calibration failure of the card recognition unit 106) and handle the situation. Also, if the card has been correctly recognized, then information to be referred to in determining the strategy in playing the fighting game is displayed along with each card, and thus, it is possible to determine with ease whether to move the card to the attack area 401 or the standby area 402 during the current round, whether to move the card to a given position within the attack area, or the like, and appropriately start the movement operation.

<Action Phase>

When the strategy phase ends (by a decision operation or time running out), the action phase of the same round is started. Characters on which actions are to be performed during the action phase are typically characters of the player team and the opponent team at are disposed in the attack area 401. The action phase is a phase for presenting attack motions to be performed on the basis of results of the movement operation of cards performed during the strategy phase, and unlike the strategy phase, does not require movement of the cards.

First, when the action phase starts, it is determined whether the player team or the opponent team performs an attack motion first. Determination of attack order may be performed by performing a prescribed operation such as adding, to a parameter (value) such as attack strength determined for each character placed in the attack area 401 of each team, a value based on action points consumed according to the position of the character in the attack area 401, to calculate the sum of the parameters of each team, for example, and determine the order based on the size relationship (the team with the larger value goes first).

In determining attack order, the characters in the attack area 401 of the first team are grouped on the basis of attack attributes, compatibility, placement position, and the like, and each group performs an attack motion. At this time, the second team is also similarly grouped, and attack targets (defending groups) of each group of the first team are determined. Below, the actions of the first team when performing an attack motion will be described, but after the first team finishes their attack motion, the first team and second team switch between the offensive side and the defensive side, respectively, and attack motions by the second team are similarly performed.

Attack motions are selected one at a time by the set groups of the first team, for example, and in each group, after a basic animation of the start of the attack motion is displayed, determination of the success or lack thereof of the attack motion based on the success or lack thereof of the second operation of the present invention is performed. Success or lack thereof of the attack motion is determined by the lengths of gauges provided to the attacking groups and the defending groups as shown in FIG. 5A (gauge match), for example, and if a gauge 501 of the attacking group exceeds a gauge 502 of the defending group as shown, then the attack motion is determined to have succeeded. Here, the determination of the length of each gauge is made by an operation input (operation of a physical button) according to gauge stoppage between when the length of the gauge sequentially fluctuates if the team is the player team. On the other hand, if the team is the opponent team operated by an NPC, the length of the gauge is determined by processing in which operation input according to gauge stoppage is performed at a timing determined randomly by a lottery process. Also if the team is the opponent team operated by a user of another game device, the length of the gauge is determined by an operation input according to gauge stoppage performed in the other game device.

If the attack motion was determined to be successful, then the damage (amount to subtract from health) on the defending team is determined, and display of a first animation for a successful attack motion indicating that the basic attack motion has succeeded (that the hit was received without being blocked by the character on the defending team) is started. If the attack motion was determined to have failed, a smaller amount of damage than that of a successful attack motion is determined, and display of a first animation for a failed attack motion indicating that the basic attack motion has failed (that the hit was blocked by the character on the defending team) is started.

The animation in the description of the present invention refers to a series of screen transitions (group of images/frames) that progress while the content changes continuously over at least a portion of time, this animation being displayed for an event that occurs due to a change in the game, and preferably, an event that occurs due to an operation performed by the user. The display of the animation may be performed by replaying fixed video content prepared in advance by a prerendering process or the like, or may be performed by generating each frame by successively drawing a corresponding image while taking into consideration dynamically changing elements in the game. Below, the game device 100 of the present embodiment will be described as one where the latter is true; that is, the display control unit 105 draws the game screen in accordance with the progression of the game and the game screen is displayed in the first display 120, thereby displaying the animation.

Figure 9A:
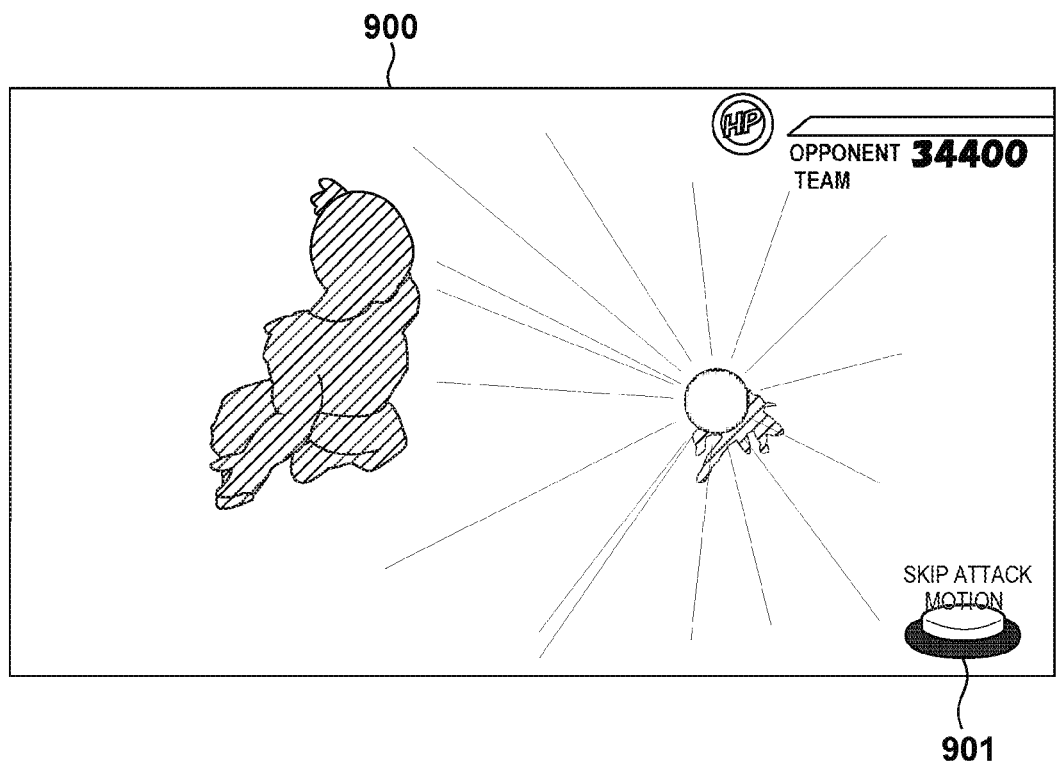
FIGS. 9A and 9B show examples of game screens displayed in a first display 120 during an action phase of a fighting game according to an embodiment and a modification example of the present invention.

The first animation is one that is determined in advance according to each character or a combination of characters in a group, and that shows operations pertaining to the basic attack motion, for example, and essentially does not depend on the success of the attack motion. Screens such as a screen 900 of FIG. 9A are sequentially displayed in the first display 120. The first animation is constituted of an attack motion by a character in the attacking group and a hit motion by a character in the defending group that receives the attack motion, and if the combination of success/failure is the same for the character and attack motion of the attacking group, then the progression is the same every time. As an example, a configuration may be adopted in which an attack motion during the first animation is determined by one motion by a character or combination of characters of the attacking group, and a hit motion is determined by a common motion (blocking) regardless of the character if the basic attack motion failed, and determined by one motion (hit) corresponding to the determined attack motion if the basic attack motion is successful. Thus, the first animation by the display control unit 105 is generated for each frame by applying attack motion data determined for each character to a 3D model of the character in the attacking group, and applying hit motion data determined for each character to a 3D model of the character in the defending group.

After display of the first animation of the basic attack motion, the damage dealt to the defending team is displayed. In the present embodiment, even if the attack motion failed, some damage is dealt to the defending team, though less than that of a successful attack motion, but a configuration may be adopted in which no damage is dealt from a failed attack motion.

Also, in the game provided in the game device 100 of the present embodiment, if it is determined that the attack motion was successful and the length of the gauge for determining whether the attack motion is successful exceeds a threshold 503 such as shown in FIG. 5A, then a special attack motion is generated after the basic attack motion. Display of the special attack motion is performed after display of the first animation for the basic attack motion ends but before display of the damage, and is performed by displaying a second animation for the special attack motion in first display 120. In other words, in the game device 100 of the present embodiment, there are three types of animation display that can occur for an attack motion by one attacking group as shown in FIGS. 6A, 6B, and 6C. Among the examples of FIGS. 6A, 6B, and 6C, FIG. 6A shows a display transition for a case in which the gauge exceeds the length of the threshold 503 and the attack motion succeeds, FIG. 6B shows a display transition for a case in which the gauge does not exceed the length of the threshold 503 but the attack motion is successful, and FIG. 6C shows a display transition for a case in which the attack motion fails.

The second animation for the special attack motion differs from the basic attack motion so as to engage the interest of the user and allow the user to be fully immersed in the content, and as shown in FIG. 5B, the second animation is displayed by the first display 120 and the second display 130 in coordination with each other. More specifically, in generating each frame of the second animation including characters performing a special attack motion, the display control unit 105 defines two different drawing perspectives on the basis of the positional relationship between the first display 120 and the second display 130 in the game device 100, determines the drawing range for each perspective such that the displayed portions of the character do not overlap, and draws the screen displayed in each display. For simplicity, in the present embodiment, the special attack motion occurring after the basic attack motion is performed by one character within the attacking group, and triggers certain moves ad skills determined uniquely for the character. The special attack motion differs from general moves (punching, kicking, shooting, etc.) that accompany a general motion such as used in generating the first animation of the basic attack motion, and is a motion determined uniquely for the character or a character having some attributes. When generating the special attack motion, the control unit 101 further increases the damage dealt to the defending team than the amount determined for when the basic attack motion is successful.

Here, the first animation and the second animation are different types of animations. The two animations may differ not only in whether display thereof is performed in only the first display 120 or in both the first display 120 and the second display 130, whether actions by the character displayed in the animation constitute a basic attack motion or a special attack motion, and whether the animation depends on the success or failure of the attack motion, but also differ in the following respects, for example.

The content of first animation is determined according to the combination of the character of the attacking group and the success/failure of the attack motion and configuration of the animation is similar regardless of the combination, and thus, in one round of gameplay, there is a tendency for animations with similar content to be displayed repeatedly. On the other hand, the second animation is generated under the limited conditions that the attack motion is determined to have been successful and the gauge length exceeds the threshold 503, and different special attack motions are generated according at least one of the following factors, for example: which of the characters is selected as the performer of the special attack motion; the state of the character in the current game; and the timing, number, and gauge length (threshold 503 to maximum length) of the special motion in each round of gameplay. Thus, it is rare for an animation with the same content to be repeatedly displayed within one or more rounds of gameplay.

Therefore, in the game provided in the game device 100 of the present embodiment, regarding the first animation, which by displaying similar content a plurality of times within the same round of gameplay can cause the user to lose interest, a configuration is provided that allows input of an operation to stop display (skip operation) (first operation) of the first animation. Here, stoppage of display of the animation refers to performing control so as not to generate frames during a stoppage of display excluding frames that were displayed until the operation was received, among the entire displayed animation (group of frames), and so as not to display the frames in the first display 120. If an operation to stop display can be received, then a notification image 901 indicating that it is is possible to input such an operation is displayed at a fixed position to the lower right of the screen 900 (frame) as shown in FIG. 9A, for example. The operation not to display the animation may be received by operation input to an operation member such as a button of the game device 100.

The input display control unit 105 controls drawing such that the notification image 901 is displayed in the screen while the first animation is being displayed in the first display 120, and upon receiving an operation to stop display during the display period of the first animation, the control unit 101 causes the display control unit 105 to stop displaying the first animation. Also, in the present embodiment, if there is an operation to stop display of the first animation, the control unit 101 performs control to stop all display of the first animation thereafter. In other words, where the first animation is displayed a plurality of times during one round of gameplay, if an operation to stop display is performed during display of any of the first animations, the control unit 101 does not display the not-yet-displayed portions of the first animation, which was being displayed when the operation was performed, and control is performed such that subsequent first animations are not displayed. In the present embodiment, if an operation to stop display is performed once, display of all first animations thereafter is stopped, but a configuration may be adopted in which in general the first animation is displayed, and if an operation to stop display is performed in the middle of each first animation, the not-yet-displayed portions are not displayed. Alternatively, a configuration may be adopted in which after the operation to stop display of the first animation is performed a prescribed number of times, display of any subsequent first animations is stopped.

On the other hand, the second animation rarely occurs and during the second animation more damage than could be expected in a basic attack motion is dealt to the defending team, and thus, in the game provided in the game device 100 of the present embodiment, no control is performed to stop the second animation in order to make it clear that a special attack motion has occurred. Thus, while the second animation is being displayed in the first display 120 and the second display 130, the display control unit 105 controls drawing such that the notification image 901 is not displayed, and during display of the second animation, the control unit 101 does not receive an operation to stop display. In other words, if conditions to display the second animation are satisfied, the second animation is always displayed. By doing so, it is possible for the user to recognize that a special attack motion has occurred in which the amount of damage dealt differs from a basic attack motion, and it is possible to show an animation that draws a high degree of interest due to non-normal motions being displayed. In the game device 100 of the present embodiment, the second animation is displayed using the first display 120 and the second display 130, but implementation of the present embodiment is not limited thereto. However, display of the animation using the first display 120 and the second display 130 has a tendency to draw attention, and by always displaying special attack motions of a configuration differing from normal, the interest of more users can be drawn, and as a result, it is possible to encourage many users to use the game device 100. That is, the game has a plurality of settings, including a setting for setting a level of difficulty of the video game. In response to the reception of the skip operation during the display of the first animation, the control unit 101 and/or the display control unit 105 change one of the plurality settings, to encourage many users to use the game device 100.

As can be seen from the screen displayed in the second display 130 in FIGS. 5A and 5B, during the action phase of the fighting game executed in the game device 100 of the present embodiment, the game screen of the strategy phase in which associated images of the cards are displayed in the placement position of the cards is not displayed in the second display 130. This is to prevent the user from mistakenly believing that it is necessary to operate the card as a result of the associated image of the card being displayed during the action phase during which operation of the card is unnecessary, or to avoid a situation in which it is difficult to focus on the first display 120 where the gauge determination operation and the like are displayed, for example. In the present embodiment, during the action phase, the attack area 401 and the standby area 402, where the character arrangement is determined, are not displayed in the second display 130, but the above-mentioned effect can be attained by performing control such that display of at least the associated images is not performed, and thus, embodiments of the present invention are not limited to such a configuration.

In other words, the strategy phase and the action phase of the fighting game have differing screens to which the user should pay attention, according to whether movement operations of cards placed on the placement panel 131 can be received. Thus, during the action phase, display of the notification image 901 indicating that it is possible to receive an operation to stop display of the first animation is performed in the first display 120, which is the screen to which the user should pay attention during this phase, and not the second display 130.

<<Gameplay Provision Process>>

Figure 7:
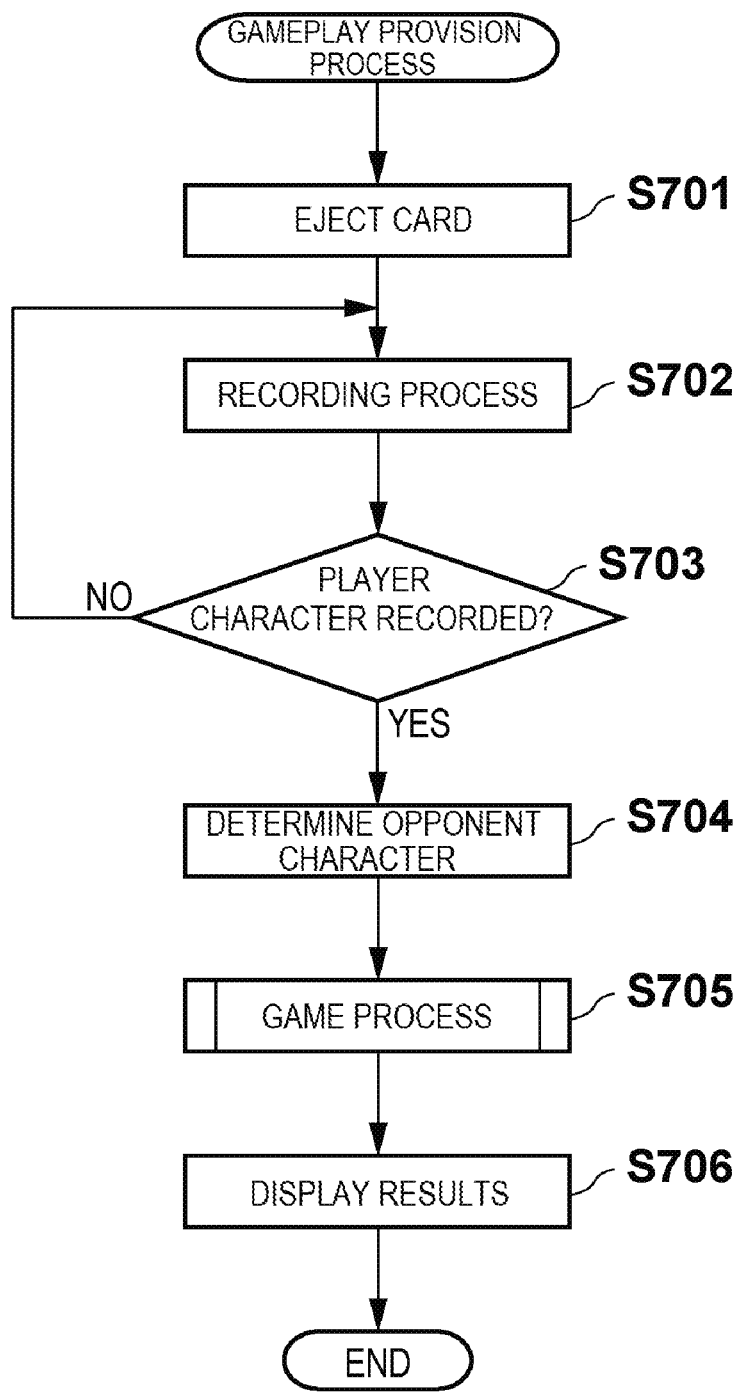
FIG. 7 is a flowchart showing an example of a gameplay provision process executed in the game device 100 according) an embodiment and a modification example of the present invention.

In the game device 100 of the present embodiment having such a configuration, the gameplay provision process executed during each round of gameplay will be described specifically with reference to the flowchart of FIG. 7. The process of the flowchart can be realized by the control unit 101 reading a corresponding processing program stored in the recording medium 102 and loading such programs in a memory 103 and executing them. The gameplay provision process is started when payment of a fee for one round of gameplay, for example, is detected by the payment detection unit 104. During execution of the gameplay provision process, unless otherwise noted, the display control unit 105 appropriately generates screens corresponding to the progression of the game and causes the screens to be displayed in the second display 130 and the first display 120 on the basis of processes and commands performed by the control unit 101.

In S701, under control of the control unit 101, the ejection control unit 108 causes the ejection unit 140 to eject a card for this round of gameplay.

In S702, the control unit 101 executes a recording process for player characters and records the player characters to be used in the fighting game. The recording process is performed by the user placing cards of characters that the user wishes to appear as part of the player team on the placement panel 131 of the second display 130. During the recording process, if there is a change in the card placed on the placement panel 131 (such as a new card being detected, or a detected card being deleted (by being removed)), a corresponding process (addition or deletion of information) is performed. If a new card is detected, for example, the card recognition unit 106 acquires the character ID (item information) of an associated character by analyzing an invisible code printed on the card, and outputs to the control unit 101 the character ID together with the detected coordinates and direction of the card. The control unit 101 acquires the character information of the card from the character DB 107 on the basis of the character ID, adds the character information to a player character management table that manages the player characters, and stores the character information in the memory 103. The information of each record managed per player character in the player character management table may have a data structure such as that shown in FIG. 3B, for example. In the example of FIG. 3B, the information managed for each player character is associated with the acquired character ID 311, and has the character ID 312, the various parameters 313, the display information 314, the detected coordinates and direction 315 of the current card, and action points 316 that are used in displaying the associated images. At this time, no movement operation input or the like is necessary, and thus, the display control unit 105 may display a character image corresponding to the detected card in the first display 120, and enable the user to know whether or not the card has been correctly recognized.

In S703, the control unit 101 determines whether recording of the player characters has been completed. Completion of recording of the player characters may be determined according to whether an operation input by the user indicating completion of recording has been detected, or recording of the maximum number of player characters (seven) has been completed. The control unit 101 proceeds to S704 if it is determined that recording of the player characters is complete, and returns to S702 if it is determined that recording of the player characters is not yet complete.

In S704, the control unit 101 determines the opponent characters in the opponent team in the fighting game. Determination of the opponent characters may be performed by the user inputting an operation to select opponents or select a stage, by the progression of the game managed in association with identification information of the user acquired separately, according to results of a prescribed lottery process, or the like. Also, the information of the determined opponent characters may, similarly to the player characters, be recorded as one record per character in an opponent character management table stored in the memory 103. The information of each record managed for each opponent character in the opponent character management table may have a similar data structure to the information managed in the player character management table, and in such a case, the information managed as the detected coordinates and direction 315 may be determined without placement of an actual card if the opponent is an NPC.

In S705, the control unit 101 executes a game process pertaining to the fighting game in which the recorded player characters and opponent characters appear.

<Game Process>

Figure 8:
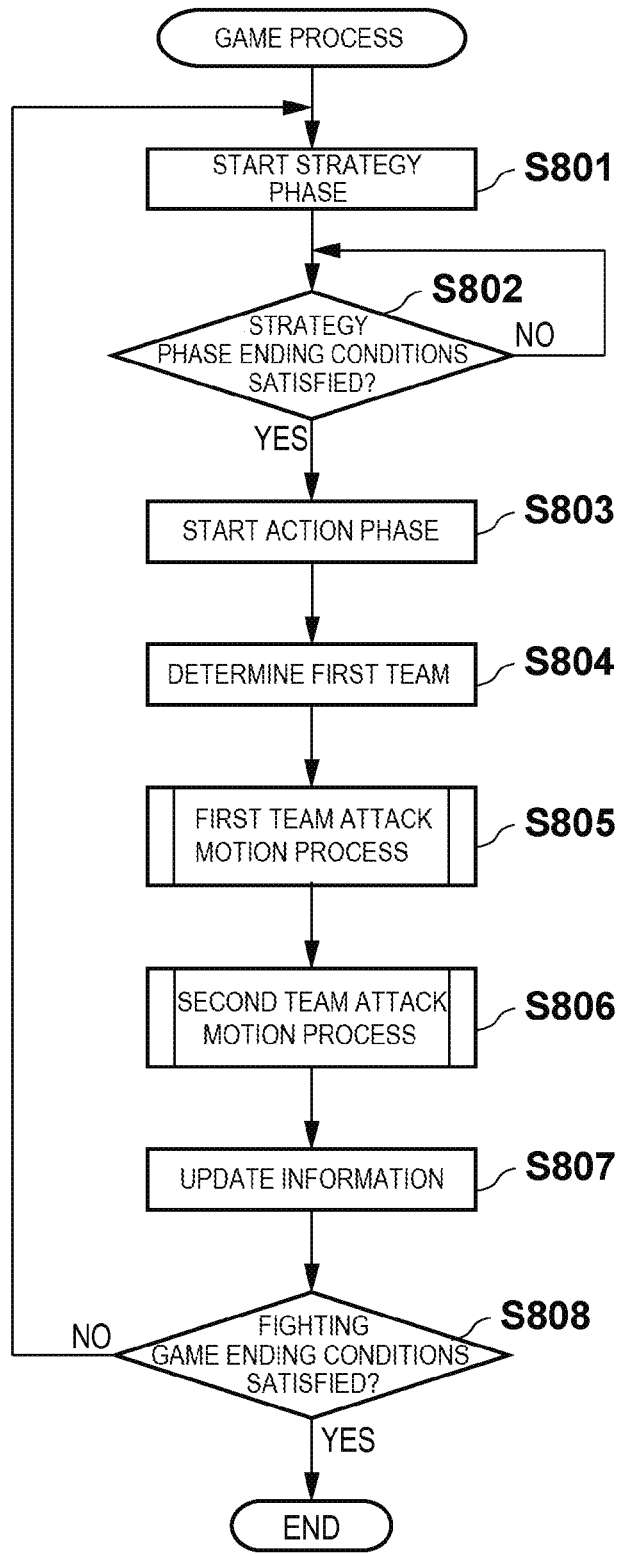
FIG. 8 is a flowchart showing an example of game process according to an embodiment and a modification example of the present invention.

Below, the game process of this step will be explained below in detail with reference to the flowchart of FIG. 8.

In S801, the control unit 101 starts the process of the strategy phase of the current round. During the strategy phase, in order to display the associated image of each card detected by the card recognition unit 106 as described above, the display control unit 105 refers to the detected coordinates and direction 315 of each player in the player character management table, and generates and updates the game screen (game screen 400 of FIG. 4A and associated images) displayed in the second display 130. During the strategy phase, when movement of a card placed on the placement panel 131 is detected, information on the detected coordinates and direction 315 of the player character management table in which each player character is managed may be sequentially updated with information associated with the card being modified, and the display control unit 105 refers to the information when the screen updates, determines the position and direction to draw the associated image and generates the game screen, and updates the display. During this time, when the player character management table is updated or at a prescribed update frequency, the display control unit 105 generates and updates the display of the game screen (game screen 420 of FIG. 4C) displayed in the first display 120 to reflect movement of the cards.

In S802, the control unit 101 determines whether conditions to end the strategy phase have been satisfied. Ending conditions of the strategy phase may be determined to have been satisfied if a decision operation to decide the arrangement of the player characters has been performed as described above, for example, or a predetermined amount of time that the user can perform operations during the strategy phase has elapsed. The control unit 101 proceeds to S803 if it is determined that ending conditions of the strategy phase have been satisfied, and repeats the process of this step if it is determined that the ending conditions have not been satisfied.

In S803, the control unit 101 starts the process of the action phase of the current round. When the action phase starts, the display control unit 105 switches the game screen displayed in the second display 130 to a screen where associated images of the cards are not displayed and an overhead view of the game field (world) of the fighting game, for example, is displayed (the display in the second display 130 in FIG. 5A).

In S804, the control unit 101 determines whether the player team or the opponent team goes first in the action phase of the current round. The determination may be performed according to the detected coordinates and direction 315 of the cards placed so as to overlap the attack area 401 as described above, and the action points 316 to be consumed.

In S805, the control unit 101 executes an attack motion process to perform various processes pertaining to the attack motion of the first team, with the first team being set as the attack team and the second team being set as the defending team.

<Attack Motion Process>

Figure 10:
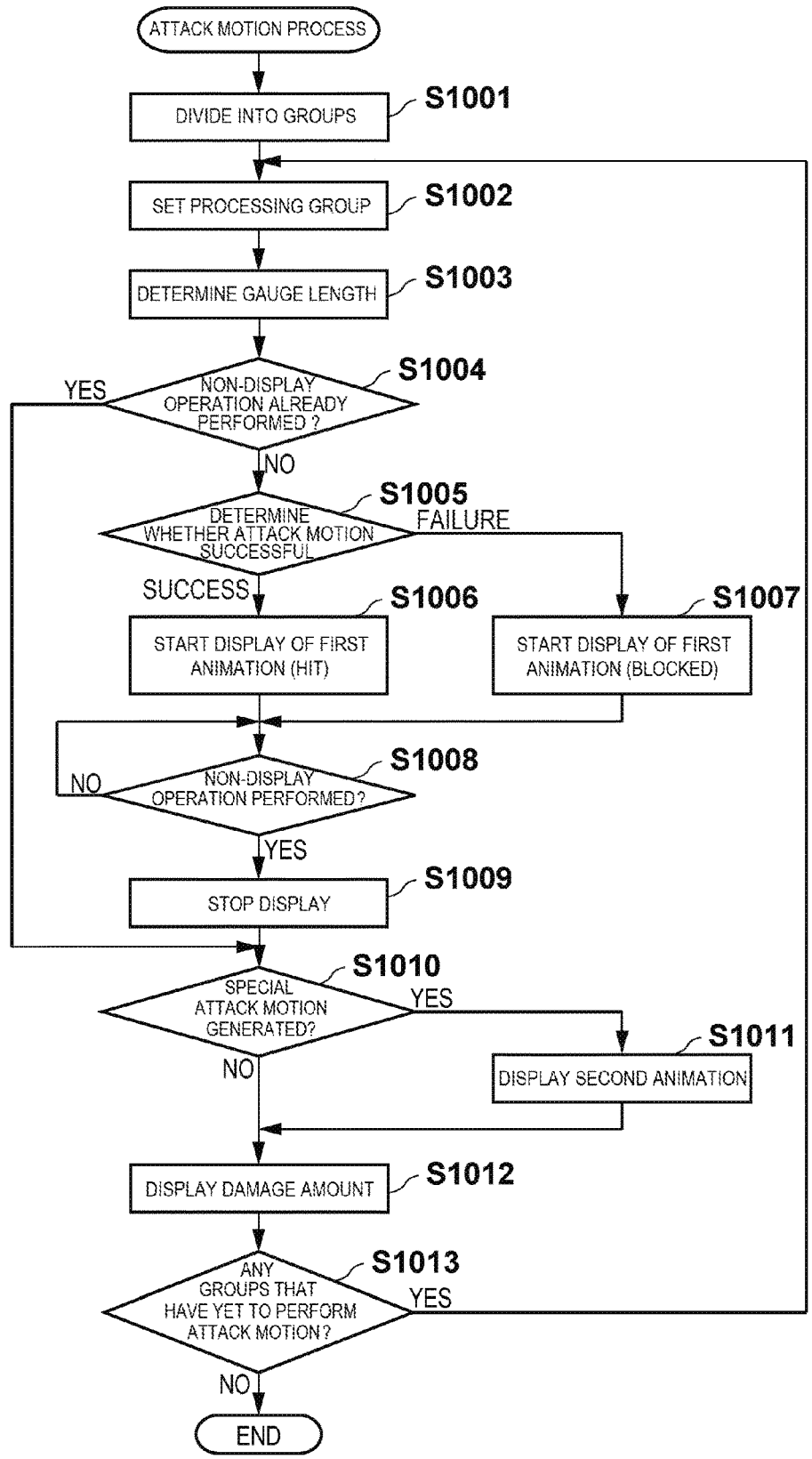
FIG. 10 is a flowchart showing an example of an attack motion process according to an embodiment and a modification example of the present invention.

Here, the attack motion process executed in this step will be explained below in detail using the flowchart of FIG. 10.

In S1001, the control unit 101 divides the attacking team and the defending team into groups, which are units for displaying the attack motion. Also, the control unit 101 determines a group of the defending team to be attacked, for each group in the attacking team.

In S1002, the control unit 101 sets a group that has not yet performed the attack motion, among the groups of the attacking team, as the processing group.

In S1003, the control unit 101 determines the gauge length for the attack motion for the processing group and the group to be attacked (groups on the defending team). The control unit 101 receives input of an operation to stop the gauge, and determines the length of the gauge of each group on the player team. Also the control unit 101 executes a prescribed process pertaining to groups of the opponent team, and determines the length of the gauge.

In S1004, the control unit 101 determines whether or not an operation to stop display of the first animation has been performed. In the game device 100 of the present embodiment, during one round of gameplay, if an operation to stop display of the first animation is performed while the first animation is being displayed in the first display 120, then the control unit 101 stores in the memory 103 information indicating that an operation to stop display has been performed (boolean, for example). Thus, in this step, the control unit 101 determines whether such information is stored in the memory 103. The control unit 101 proceeds to S1010 if it is determined that an operation to stop display of the first animation has been performed, and proceeds to S1005 if it is determined that such an operation has not been performed.

In S1005, the control unit 101 determines whether the attack motion was successful on the basis of the gauge length determined in S1003. The control unit 101 proceeds to S1006 if it is determined that the attack motion of the processing group was successful, and proceeds to S1007 if it is determined that the attack motion failed.

In S1006, the control unit 101 causes the display control unit 105 to generate the first animation for a basic attack motion indicating that the target group was hit by the attack, and starts display of the first animation in the first display 120. At this time, the display control unit 105 superimposes the notification image on frames of the first animation, thereby forming the screen displayed in the first display 120.

On the other hand, if in S1005, it is determined that the attack motion of the processing group has failed, then in S1007 the control unit 101 causes the display control unit 105 to generate the first animation for a basic attack motion indicating that the target group blocked the attack, and starts display of the first animation in the first display 120 (the display including the notification image in a manner similar to S1006).

In S1008, the control unit 101 determines whether or not an operation to stop display of the first animation has been performed. The control unit 101 proceeds to S1009 if it is determined that there was an operation to stop display of the first animation, stops display of the first animation in the first display 120 by the display control unit 105, stores in the memory 103 information indicating that an operation to stop display was performed, and proceeds to S1010. If the control unit 101 determines that there was no operation to stop display of the first animation, then the process of this step is repeated until display of the first animation is complete (last frame is displayed). If display of the first animation is completed without an operation to stop display, the control unit 101 does not perform the process of S1009 of stopping display of the first animation, and proceeds to S1010.

In S1010, the control unit 101 determines whether a special attack motion of the processing group should be made on the basis of the gauge length determined in S1003. More specifically, the control unit 101 determines whether or not to cause the special attack motion to occur on the basis of two conditions: whether the attack motion of the processing group has succeeded, and whether the determined gauge length exceeds the threshold. The control unit 101 proceeds to S1011 if it is determined that the special attack motion of the processing group should occur, and proceeds to S1012 if it is determined that the special attack motion should not occur.

In S1011, the control unit 101 determines one of the characters of the processing group to be the one to make the special attack motion, causes the display control unit 105 to generate the second animation for a special attack motion determined for the character, and starts display of the second animation in the first display 120 and the second display 130. At this time, the display control unit 105 does not superimpose the notification image on frames of the second animation, and forms the screen displayed in the first display 120 and the second display 130.

In S1012, the control unit 101 subtracts a value from the team health of the defending team on the basis of the amount of damage dealt, which was determined for the attack motion of the processing group. The control unit 101 controls the display control unit 105 so as to cause the amount of damage dealt to be displayed in the first display 120.

In S1013, the control unit 101 determines whether or not there is a group that has not yet presented an attack motion, among the groups of the attacking team. If it is determined that there is a group that has not yet performed an attack motion, the control unit 101 returns to S1002, and if it is determined that there are no more such groups, then this attack motion process is completed.

When the attack motion process of the first team ends in this manner, in S806, the control unit 101 interchanges the first team and the second team such that the second team is the attacking team and the first team is the defending team, and executes an attack motion process to perform various processes pertaining to the attack motion of the second team. A configuration may naturally be adopted in which the process of S806 is only executed when the team health of the second team is greater than 0 (there is still health left) after the process of S805.

In S807, the control unit 101 updates the action points 316 of each character managed in the character management table of each team according to actions performed during the current round (including not only attack motions but moving to the standby area 402).

In S808, the control unit 101 determines whether conditions to end the fighting game have been satisfied. Ending conditions of the fighting game may be determined on the basis of whether or not the team health of either team is greater than 0, or whether or not the current round is the last round. The control unit 101 completes this game process if it is determined that ending conditions of the fighting game have been satisfied, and if the ending conditions are not satisfied, returns to S801 and performs the process of the next round.

When the game process ends, the display control unit 105 displays the results of the fighting game in the first display 120, for example, in S706 of the gameplay provision process, and then ends the gameplay provision process. By doing so, in the game device 100 of the present embodiment, it is possible to select between displaying and not displaying at least the first animation, and thus, it is possible to change the play experience of the game depending on the goals and preferences of each user. Also, in the game device 100 of the present embodiment, if an operation to stop display of the first animation has been performed, then it is possible to reduce the amount of gameplay time required to display the first animation for each round of gameplay, and as a result, it is possible to increase the turnover rate (usage rate per unit time) of the game device 100, thereby avoiding a lengthened wait time for gameplay, which could reduce the user's interest in the game.

Modification Example 1

In the embodiment above, a notification image is displayed indicating that it is possible to receive an operation that stops display of the first animation, and when the operation is performed, the portions of the first animation that have not yet been displayed are not displayed. As a result, the play time for gameplay is reduced and it is possible to increase the turnover rate for the game device 100. This effect is suitable for users who are waiting to play the game device 100.

However, this effect is only attained if the user engaging in gameplay has specific preferences and goals such as wanting to shorten play time, wanting to avoid repeated display of the first animations having similar content, or the like. That is, shortening of gameplay in the game device 100 is realized if a user having specific preferences and goals is playing the game, and is not realized during gameplay by other users. Thus, an increase in turnover rate in the game device 100 cannot always be expected.

Thus, in order to encourage more users to perform the operation to stop display of the first animation and realize increased turnover, a configuration may be adopted in which, if an operation to stop display of the first animation is performed, then the control unit 101 performs control to stop display of the not-yet-displayed portions of the first animation, and to make the progression of gameplay advantageous to the user. In other words, a configuration may be adopted in which, by performing control so that the game suitably progresses, a play experience that draws greater interest is provided to users who contribute to increased turnover in the game device 100. At this time, the notification image may inform the user that performing the operation to stop display of the first animation would result in more suitable progression of the game.

Control to cause the game to suitably progress may be performed such that if there are a plurality of opportunities in one round of gameplay to display the first animation such as in the embodiment above, for example, more advantage is provided by performing the operation to stop display of the first animation at an early display opportunity, or in other words, by reducing the number of times that the first animation is displayed. By doing so, the earlier the operation to stop display of the first animation is performed, the fewer the number of times the first animation is displayed during gameplay is, and thus, it is possible to further reduce the play time of the game.

Also, in addition to or instead of this, control may be performed such that the game progression occurs suitably the fewer the number of frames of the first animation is, or in other words, the shorter the amount of time that the first animation is displayed is.

Modification Example 2

In the embodiment above, the notification image is displayed at a fixed position in the screen displayed in the first display 120, but implementation of the present embodiment is not limited thereto. As described regarding Modification Example 1, the earlier the operation to stop display of the first animation is performed, the greater the turnover rate of the game device 100 is. Thus, a configuration may be adopted in which the display position of the notification image 901 sequentially changes each time the first animation is displayed, starting at the lower right as shown in FIG. 9A and progressively moving towards a prescribed position such as the center, which would garner more attention from the user.

Figure 9B:
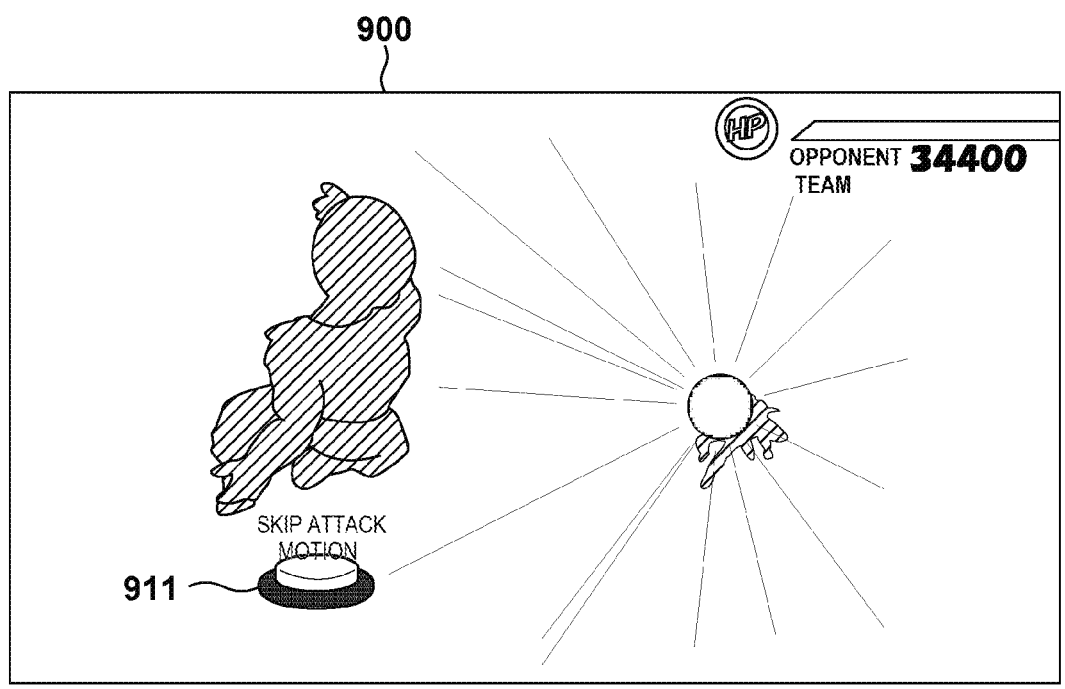

Alternatively, instead of the display position of the notification image being changed so as to increase the certainty of drawing attention the more times the first animation is displayed, a configuration may be adopted such that as shown in FIG. 9B, for example, the notification image is displayed at a position (near position, etc.) in the first animation corresponding to the display position of a character used by the user (player team character) (911 in the drawing).

Modification Example 3

Also, in the embodiment and Modification. Examples 1 and 2, a notification image indicating that it is possible to receive an operation to stop display is always displayed during the plurality of times that the first animation is displayed, but for users who wish to enjoy the animation, this notification image would be bothersome and impede a suitable play experience for them. Thus, the control unit 101 may control the display control unit 105 such that the notification image is only displayed the first time or a prescribed number of times from the first time that the first animation is displayed, and if no operation to stop display of the first animation was performed, or in other words, the first animation was viewed in its entirety the first time or the prescribed number of times, then the notification image is caused not to be displayed during any first animations thereafter.

Other Embodiments

The present invention is not limited to the embodiments, and it is possible to make various modifications and changes without departing from the spirit and scope of the present invention. The game device of the present invention can be realized by a program in which one or more computers function as the game device. The program can be provided/distributed by being recorded in a computer-readable recording medium or through a telecommunications line.

DESCRIPTION OF REFERENCE CHARACTERS

100 game device
101 control unit
102 recording medium
103 memory
104 payment detection unit
105 display control unit
106 card recognition unit
107 character DB
108 ejection control unit
109 operation input unit
110 communication unit
120 first display
130 second display
131 placement panel
140 ejection unit

What is claimed is:
1. A game device for playing a video game, comprising:
a first display configured to display the video game;
a second display, differing from the first display, having a second display area therein, the second display area including an operation area on which a user item of a user is movably placeable;
a computing device; and
a storage medium containing program instructions stored therein, execution of which by the computing device causes the game device to provide the functions of:
a recognition unit configured to obtain item information from the user item, the item information including a game character which the user plays in the video game;
an operation input unit configured to receive an input of an operation for the video game from the user; and
a controller configured to
control the displaying of the video game to cause the game character to appear on the first display, using the item information, the video game including a first animation that is related to the game character and that includes a plurality of frames,
cause a notification image for notifying the user of a timing of a first operation to be displayed on the first display, while displaying the first animation, the displaying of the first animation being stopped in response to reception of the first operation, and in response to the reception of the first operation by the operation input unit during the displaying of the first animation, cause the rest of frames of the first animation after a timing at which the first operation is received not to be displayed, wherein the controller causes the notification image to be displayed near the game character that appears in the first animation, the operation input unit further receives movement information of the user item, based on a position of the user item in the operation area, and the controller causes the notification image to be displayed on the first display during a period in which the movement information is not received.

2. The game device according to claim 1, wherein the video game has a plurality of settings, including a setting for setting a level of difficulty of the video game, and in response to the reception of the first operation by the operation input unit during the displaying of the first animation, the controller changes one of the plurality of settings.

3. The game device according to claim 1, wherein the controller causes the first animation to be displayed for a plurality of display timings during each round of the gameplay, and in response to the reception of the first operation during the displaying of the first animation, further causes the first animation not to be displayed for the rest of the display timings.

4. The game device according to claim 3, wherein the video game has a plurality of settings, including a setting for setting a level of difficulty of the video game, and the controller further changes one of the plurality of settings, based on a total number of the rest of frames of the first animation and a total number of the rest of display timings of the first animation.

5. The game device according to claim 3, wherein after the first operation is received during the displaying of the first animation, the controller causes the notification image not to be displayed for all subsequent display timings of the first animations.

6. The game device according to claim 1, wherein the controller causes the notification image to continue to be displayed for a period during which the first animation is displayed on the first display.

7. The game device according to claim 1, wherein the first display has a first display area in which the video game is displayed, and the controller displays the notification image at a fixed position in the first display area.

8. The game device according to claim 1, wherein the controller causes the first animation to be displayed for a plurality of display timings during each round of the gameplay, the first display has a first display area in which the video game is displayed, and the controller changes a display position of the notification image in the first display area, based on a total number of the first animation being displayed.

9. The game device according to claim 1, wherein the controller controls not to display the notification image on the second display.

10. A game device for playing a video game, comprising:
a first display configured to display the video game:
a computing device; and
a storage medium containing program instructions stored therein, execution of which by the computing device causes the game device to provide the functions of:
a recognition unit configured to obtain item information from a user item of a user, the item information including a game character which the user plays in the video game;
an operation input unit configured to receive an input of an operation for the video game from the user; and
a controller configured to
control the displaying of the video game to cause the game character to appear on the first display, using the item information, the video game including a animation that is related to the game character and that includes a plurality of frames,
cause a notification image for notifying the user of a timing of a first operation to be displayed on the first display, while displaying the first animation, the displaying of the first animation being stopped in response to reception of the first operation, and
in response to the reception of the first operation by the operation input unit during the displaying of the first animation, cause the rest of frames of the first animation after a timing at which the first operation is received not to be displayed, wherein
the controller causes the notification image to be displayed near the game character that appears in the first animation,
the operation input unit receives a second operation from the user,
the controller determines whether a result of the second operation is a success or failure, and
the video game includes a second animation that is displayed after the controller determines the second operation is a success, and
the controller causes the second animation to continue to be displayed when the first operation is received during the displaying of the second animation.

11. The game device according to claim 10, wherein the controller causes the first animation to be displayed on the first display in response to the second operation being received, regardless of the success or the failure of the second operation, and when the second operation is determined to have been successful, the controller causes the second animation to be displayed on the first display after the first animation is displayed.

12. The game device according to claim 11, wherein the first animation and the second animation are different types of videos, each of which shows a respective action of the game character in the game.

13. The game device according to claim 11, wherein the video game is a fighting game in which the game character corresponding to the user item is made to fight another character, and each of the first animation and the second animation, displayed in response to the second operation being received, respectively corresponds to one of an attack motion or a defense motion of the game character in the fighting game.

14. A gaming item, comprising:
item information to be obtained by the recognition unit of the game device according to claim 1, wherein,
the item information includes control information for controlling the controller of the game device.

15. A computer program product for a game device, the game device including
- a first display configured to display the video game,
- a second display, differing from the first display, having a second display area therein, the second display area including an operation area on which a user item of a user is movably placeable, and
- a computing device to execute program instructions, the computer program product comprising:
- a computer readable storage medium and the program instructions stored on the computer readable storage medium, the program instructions comprising:
  - program instructions to obtain item information from the user item, the item information including a game character which is used by the user in the video game;
  - program instructions to receive an input of an operation for the video game from the user;
  - program instructions to control the displaying of the video game to cause the game character to appear on the first display, using the item information, the video game including a first animation that is related to the game character and that includes a plurality of frames;
  - program instructions to cause a notification image for notifying the user of a timing of a first operation to be displayed on the first display, while displaying the first animation, the displaying of the first animation being stopped in response to reception of the first operation, the notification image being displayed near the game character that appears in the first animation;
  - in response to the reception of the first operation during the displaying of the first animation, program instructions to cause the rest of frames of the first animation after a timing at which the first operation is received not to be displayed;
  - program instructions to receive movement information of the user item, based on a position of the user item in the operation area; and
  - program instructions to cause the notification image to be displayed on the first display during a period in which the movement information is not received.

* * * * *